(12) United States Patent
Stecher et al.

(10) Patent No.: US 8,920,086 B2
(45) Date of Patent: Dec. 30, 2014

(54) TAPER BOLT CONNECTION AND USE OF A TAPER BOLT CONNECTION

(75) Inventors: Gerhard Stecher, Hamburg (DE); Wilhelm Rombs, Tostedt (DE)

(73) Assignee: Airbus Operations GmbH, Hamburg (DE)

( * ) Notice: Subject to any disclaimer, the term of this patent is extended or adjusted under 35 U.S.C. 154(b) by 1736 days.

(21) Appl. No.: 12/084,348

(22) PCT Filed: Oct. 31, 2006

(86) PCT No.: PCT/EP2006/067986
§ 371 (c)(1),
(2), (4) Date: Oct. 7, 2008

(87) PCT Pub. No.: WO2007/051802
PCT Pub. Date: May 10, 2007

(65) Prior Publication Data
US 2009/0285654 A1  Nov. 19, 2009

(30) Foreign Application Priority Data
Nov. 2, 2005  (DE) .......................... 10 2005 052 014

(51) Int. Cl.
*F16B 13/06* (2006.01)

(52) U.S. Cl.
USPC ........................................ 411/57.1; 411/914

(58) Field of Classification Search
USPC .......... 411/57.1, 58, 237, 354, 426, 531, 998, 411/914; 403/388, 408.1
See application file for complete search history.

(56) References Cited

U.S. PATENT DOCUMENTS

| 1,578,073 | A |   | 3/1926  | Caproni et al. |
|-----------|---|---|---------|----------------|
| 1,596,856 | A | * | 8/1926  | Setlow ............................ 411/75 |
| 2,060,077 | A |   | 11/1936 | Hinkson |
| 3,043,210 | A | * | 7/1962  | Briscoe ......................... 100/323 |
| 3,099,470 | A | * | 7/1963  | Zumbusch ................. 403/408.1 |
| 3,199,564 | A | * | 8/1965  | Waeltz .......................... 411/280 |

(Continued)

FOREIGN PATENT DOCUMENTS

| DE | 7147013  | 12/1971 |
| JP | 52065748 | 6/1977  |

(Continued)

OTHER PUBLICATIONS

Japanese Office Action, Apr. 25, 2012.

(Continued)

*Primary Examiner* — Gary Estremsky
(74) *Attorney, Agent, or Firm* — Greer, Burns & Crain Ltd.

(57) ABSTRACT

Disclosed is a taper bolt connection including a taper bolt received in a taper bush, a fastening nut and a washer, the taper bush having a continuous longitudinal slot, and the taper bush being capable of being spread open uniformly in the radial direction by means of a fastening nut screwable onto the taper bolt. Since the taper bolt and/or the taper bush have/has, at least in regions, an at least Teflon-containing coating, tribochemical processes between the taper bush wedge surface and the taper bolt wedge surface are largely avoided, so that the taper bolt connection can be released again without great effort even after a long period of connection. Furthermore disclosed is the use of the taper bolt connection for connecting a rudder unit to a carrying structure of a fuselage cell of an aircraft.

9 Claims, 2 Drawing Sheets

(56) References Cited

U.S. PATENT DOCUMENTS

| | | | |
|---|---|---|---|
| 3,271,058 A * | 9/1966 | Anderson | 403/408.1 |
| 3,298,725 A * | 1/1967 | Boteler | 403/282 |
| 3,501,183 A | 3/1970 | Stratienko | |
| 3,603,626 A * | 9/1971 | Whiteside | 403/408.1 |
| 3,638,974 A * | 2/1972 | Stratienko | 403/12 |
| 3,641,865 A * | 2/1972 | Swindt et al. | 411/361 |
| 4,048,898 A * | 9/1977 | Salter | 411/44 |
| 4,102,036 A * | 7/1978 | Salter | 29/525 |
| 4,244,661 A | 1/1981 | Dervy | |
| 4,277,200 A * | 7/1981 | Speakman | 403/408.1 |
| 4,367,053 A * | 1/1983 | Stratienko et al. | 403/371 |
| 4,702,658 A * | 10/1987 | Salter | 411/426 |
| 4,755,904 A * | 7/1988 | Brick | 361/117 |
| 4,974,989 A * | 12/1990 | Salter | 403/408.1 |
| 5,521,951 A * | 5/1996 | Charnley et al. | 376/260 |
| 5,675,619 A * | 10/1997 | Erbes et al. | 376/302 |
| 5,803,686 A * | 9/1998 | Erbes et al. | 411/55 |
| 5,905,771 A * | 5/1999 | Erbes et al. | 376/302 |
| 5,947,496 A | 9/1999 | Kraft et al. | |
| 7,695,226 B2 * | 4/2010 | March et al. | 411/43 |
| 8,057,145 B2 * | 11/2011 | Dolan et al. | 411/57.1 |
| 8,226,320 B2 * | 7/2012 | Steinke | 403/371 |
| 8,475,102 B2 * | 7/2013 | Haylock et al. | 411/361 |
| 8,496,394 B2 * | 7/2013 | Schneider | 403/370 |
| 2003/0108398 A1 * | 6/2003 | Sathianathan | 411/60.1 |

FOREIGN PATENT DOCUMENTS

| | | |
|---|---|---|
| JP | 60031531 | 2/1985 |
| JP | 60060313 | 3/1985 |
| JP | 05067600 | 3/1993 |
| JP | 06080025 | 4/1994 |
| JP | 09257173 | 9/1997 |
| SU | 1670289 | 8/1991 |
| WO | 9837333 | 8/1998 |

OTHER PUBLICATIONS

Russian Granting Report, Jun. 4, 2010.

* cited by examiner

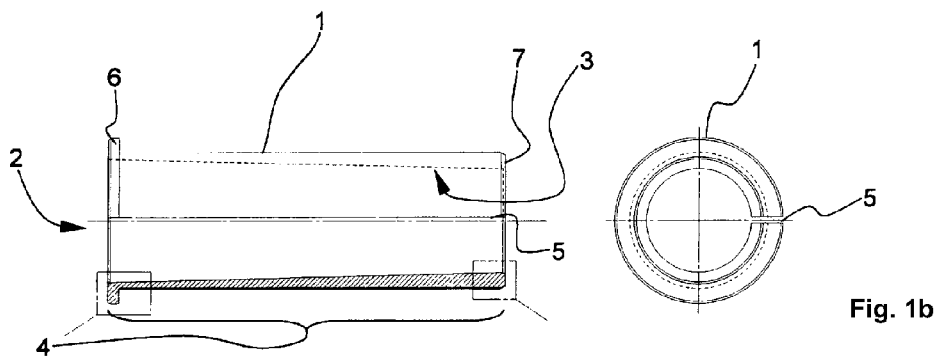
Fig. 1a
Fig. 1b
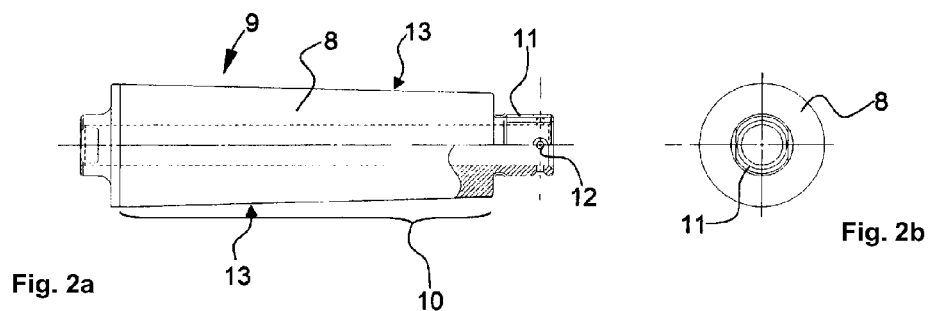
Fig. 2a
Fig. 2b
Fig. 3
Fig. 4

TAPER BOLT CONNECTION AND USE OF A TAPER BOLT CONNECTION

FIELD OF THE INVENTION

The invention relates to a taper bolt connection with a taper bolt received in a taper bush, with a fastening nut and with a washer, the taper bush having a continuous longitudinal slot, and the taper bush being capable of being spread open uniformly in the radial direction by means of a fastening nut screwable onto the taper bolt.

The invention relates, furthermore, to the use of a taper bolt connection for fastening a rudder unit to a carrying structure of a fuselage cell of an aircraft.

BACKGROUND OF THE INVENTION

Known embodiments of taper bolt connections partially have, in the wedge surface region, bronze coatings which, if necessary, are additionally greased.

As a result of the relatively soft and thick bronze layer and of the grease layer, however, tribochemical reactions between the contact surfaces are caused under alternating loads. On account of this, often very high forces, which may reach the 400 kN range, are required for demounting connections of this type.

SUMMARY OF THE INVENTION

It is one of the objects of the invention to provide a taper bolt connection which can easily be released again without the need to apply high tensile forces, so that the maintenance or mounting of taper bolt connections of this type is simplified.

This object is achieved by means of a taper bolt connection comprising a taper bolt received in a taper bush, a fastening nut and a washer. The taper bush has a continuous longitudinal slot, and the taper bush is capable of being spread open uniformly in the radial direction by means of a fastening nut screwable onto the taper bolt. The taper bolt has a coating. A taper bush wedge surface of the taper bush has a longitudinal extent which corresponds approximately to a longitudinal extent of a taper bolt wedge surface of the taper bolt. The coating of the taper bolt has at least three polytetrafluoroethylene strips which are arranged, uniformly spaced apart from one another, around the circumference of the taper bolt and each extending essentially over the entire longitudinal extent of the taper bolt wedge surface.

The taper bolt and/or the taper bush have/has, at least in regions, an at least Teflon-containing coating, a taper bush wedge surface having approximately a longitudinal extent which corresponds approximately to a longitudinal extent of a taper bolt wedge surface of the taper bolt. This results, even after a lengthy period of connection between the taper bolt and the taper bush, in a surprisingly easy releasability of the taper bolt connection according to the invention, since tribochemical reactions between the contact surfaces are largely avoided. Furthermore, the Teflon-containing coating has, in comparison with the greased bronze coating of the taper bolt, a significantly reduced coefficient of friction, so that mounting is also made easier and quicker.

In one embodiment of the taper bolt connection according to the invention, the taper bolt wedge surface and the taper bush wedge surface each have an inclination of 0.01 to 0.1. As a result, during the axial bracing of the taper bolt connection by means of the fastening nut, very high radial tension forces for fastening can be generated.

According to one particular embodiment, the Teflon-containing coating has a thickness of 0.01 mm to 0.5 mm, preferably a thickness of 0.15 mm. These ranges of coating thicknesses ensure an effective prevention of tribochemical reactions and consequently an easier demounting of the connection, but nevertheless make it possible to join the taper bolt and taper bush together with an exact fit.

Moreover, the object according to the invention is achieved by a taper bolt connection as described above that is used for fastening a rudder unit to a carrying structure of a fuselage cell of an aircraft, so that, because tribochemical reactions between the taper bolt and the taper bush are avoided, the rudder unit, if required, can easily be demounted from the carrying structure of a fuselage cell of an aircraft.

BRIEF DESCRIPTION OF THE DRAWINGS

The present invention is explained in more detail below using preferred exemplary embodiments and with reference to the attached figures of the drawings, in which:

FIG. 1a shows a side view of the taper bush of the taper bolt connection,

FIG. 1b shows a top view of the taper bush of the taper bolt connection,

FIG. 2a shows a side view of the taper bolt of the taper bolt connection,

FIG. 2b shows a top view of the taper bolt of the taper bolt connection,

FIG. 3 shows a side view of the fastening nut,

FIG. 4 shows a top view of the washer, and

In the figures, the same reference numbers refer to identical or functionally identical components unless otherwise stated.

DETAILED DESCRIPTION OF THE INVENTION

Figure 5:
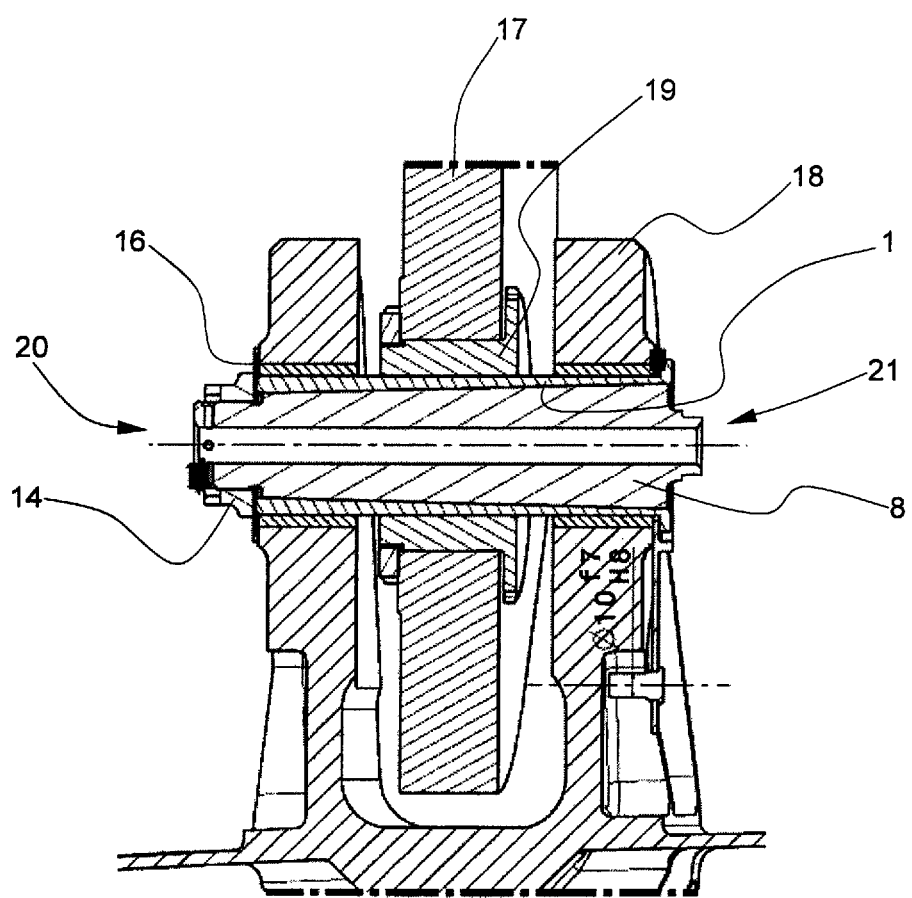
FIG. 5 shows a cross-sectional illustration through the mounted taper bolt connection.

FIGS. 1a and 1b show a side view and a top view of a taper bush 1 of the taper bolt connection according to the invention. The taper bush 1 has a continuous taper bore 2 with a taper bush wedge (or keying) surface 3 for receiving a taper bolt. The taper bush wedge surface 3 with a longitudinal extent 4 has, in the exemplary embodiment shown, an only slight inclination with respect to the horizontal, which corresponds approximately to a ratio of 1:20. Furthermore, a continuous longitudinal slot 5 extends in the axial direction over the entire length of the taper bush 1, so that the taper bush 1 can be spread open uniformly in the radial direction over its entire length as a result of the introduction of a correspondingly designed taper or taper bolt. Furthermore, the taper bush 1 has at one end a flange 6 and at an end directed away from this an outer edge 7.

FIGS. 2a and 2b show a side view and a top view of a taper bolt 8 of the taper bolt connection. Similarly to the above-described inclination of the taper bush wedge surface 3, a taper bolt wedge (or keying) surface 9 likewise has an inclination with respect to the horizontal, which corresponds approximately to a ratio of 1:20. A longitudinal extent 10 of the taper bolt wedge surface 9 corresponds approximately to the longitudinal extent 4 of the taper bush wedge surface 3. Both the taper bush wedge surface 3 and the taper bolt wedge surface 9 may in each case have inclination ratios of 1:100 to 1:10 with respect to the horizontal, depending on the respective structural requirements. What is critical is that the inclination of the taper bush wedge surface 3 and the inclination of the taper bolt wedge surface 9 are selected so as to be approximately identical, with the exception of possible manufacturing tolerances, so that, during the bracing of the taper bolt connection, the taper bolt 8 is not drawn too far through the taper bolt connection. The said inclination range ensures the possibility of generating very high radial bracing forces by the taper bush 1 being spread open by means of the taper bolt 8, and, consequently, an extremely firm fit of the connection in a fastening bore or the like. The longitudinal extents 4, 10 are preferably dimensioned approximately identically, but, if necessary, may also have values deviating from one another.

At one end of the taper bolt 8, a threaded portion 11 is arranged, which is preferably provided with a fine-pitched thread. Furthermore, in the region of the threaded portion 11, a bore 12 is arranged, into which a suitable securing means, for example a securing cotter pin, not illustrated in any more detail, can be introduced, in order to avoid an unwanted twisting of the taper bolt 8 about its longitudinal axis.

According to one aspect of the invention, the taper bolt wedge surface 9 is provided, at least in regions, with an at least Teflon-containing coating 13. The Teflon-containing coating 13 is applied to the taper bolt wedge surface 9 preferably over the entire area and, in a particularly preferred embodiment, has a thickness of about 0.15 mm. However, the material thickness of the Teflon-containing coating may have any amount between 0.01 mm and 0.5 mm. The Teflon-containing coating contains, in addition to pure Teflon or polytetrafluoroethylene (PTFE), further auxiliary components which serve, for example, for adhesion improvement or the like. The coating 13 may also be formed solely from Teflon, that is to say pure polytetrafluoroethylene.

In an exemplary embodiment, as illustrated in FIG. 2, it is likewise possible to apply the Teflon-containing coating to the taper bolt wedge surface 9 in regions only. For example, the Teflon-containing coating may be formed by three, four or more strips 13a, each including a Teflon-containing material and arranged, spaced uniformly apart from one another, around the circumference of the taper bolt 8. Surfaces not provided with a Teflon-containing coating are located between the strips. The length of the strips preferably extends over the entire longitudinal extent 10 of the taper bolt wedge surface 9.

Furthermore, in an alternative design variant of the invention, it is possible also to provide the taper bush wedge surface 3 additionally with an at least Teflon-containing coating. In a further alternative, even only the taper bush wedge surface 3 may be provided with a Teflon-containing coating, whereas the taper bolt wedge surface 9 has no Teflon-containing coating.

Both the taper bush 1 and the taper bolt 8 are formed by the same high-strength material, for example titanium, high-grade steel or the like, in order to avoid mechanical stresses as a result of temperature fluctuations. Alternatively, both the taper bush 1 and the taper bolt 8 may be formed from titanium alloys or high-grade steel alloys.

FIG. 3 shows a side view of a castle nut 14 which is screwed onto the threaded portion 11 of the taper bolt 8 in order to brace the taper bolt 8 with the taper bush 1. The castle nut 14 has at least two recesses 15, in which a securing cotter pin, not illustrated in any more detail, is received, in order to prevent an inadvertent release of the castle nut 14 from the threaded portion 11.

FIG. 4 shows a top view of a washer 16 which is preferably arranged between the castle nut 14 and the outer edge 7 of the taper bush 1, in order, inter alia, to ensure a uniform tightening of the castle nut 14.

In the exemplary embodiment shown in FIG. 5, the taper bolt connection connects a rudder unit 17 to a fork 18 which is firmly connected to a carrying structure of a fuselage cell, not illustrated in any more detail, of an aircraft. A sleeve 19 is arranged in the rudder unit 17, which is preferably formed by a fibre-reinforced plastic material, such as, for example, CFRP. The fork 18 has two bores 20, 21.

The taper bush 1 is received in the sleeve 19 and the two bores 20, 21. The taper bolt 8 is introduced into the taper bush 1 and is braced with the latter by means of the castle nut 14. The washer 16 is located between the castle nut 14 and the taper bush 1. By the taper bolt 8 being braced with the taper bush 1, the latter spreads uniformly outwards in the radial direction, so that the rudder unit 17 is braced firmly with the fork 18 after the tightening of the castle nut 14. In this operation, the taper bolt 8 is drawn into the taper bush 1 by an amount of at most 10 mm. As a result of the operation of spreading open the taper bush 1, the outside diameter of the latter increases, so that this results in a press fit of the taper bore connection in the bores 20, 21 and in the sleeve 19 of the rudder unit 17. The consequence of this being that a connection durable even with respect to highly alternating mechanical stresses (in particular, high shear forces) is obtained between the rudder unit 17 and the fork 18 connected to the carrying structure of the fuselage cell of an aircraft.

The embodiment according to the invention of the taper bolt connection also makes it possible, during the mounting operation, to have tolerance compensation between the rudder unit 17 and the fork 18 firmly connected to the carrying structure of the fuselage cell.

During operation, the taper bolt connection formed essentially by the taper bush 1, the taper bolt 8, the washer 16, the castle nut 14 and the securing cotter pin, not illustrated in any more detail, is subjected essentially to high mechanical shear forces.

The invention thus affords a taper bolt connection with a taper bolt 8 received in a taper bush 1, a fastening nut and a washer 16, the taper bush 1 having a continuous longitudinal slot 5, and the taper bush 1 being capable of being spread open uniformly in the radial direction by means of a fastening nut screwable onto the taper bolt 8, the taper bolt 8 and/or the taper bush 1 having, at least in regions, an at least Teflon-containing coating 13, a taper bush wedge surface 3 having approximately a longitudinal extent 4 which corresponds approximately to a longitudinal extant 10 of a taper bolt wedge surface 9 of the taper bolt 8.

For example, the taper bolt wedge surface 9 and the taper bush wedge surface 3 have in each case an inclination in a ratio of 0.01 to 0.1.

The Teflon-containing coating 13 has, for example, a thickness of 0.01 mm to 0.5 mm, preferably a thickness of 0.15 mm.

Preferably, the taper bolt 8 has, to form the Teflon-containing coating 13, at least three strips 13a which are arranged, preferably uniformly spaced apart from one another, around the circumference of the taper bolt 8 and extend in each case essentially over the entire longitudinal extent 10 of the taper bolt wedge surface 9 and which are formed by a Teflon-containing material or from Teflon.

The taper bush 1 and the taper bolt 8 are formed, for example, by titanium or high-grade steel.

A washer 16 is preferably arranged between the fastening nut and the taper bolt 8.

The fastening nut is designed, for example, as a castle nut 14 which is secured against inadvertent release by means of a securing element, in particular a securing cotter pin.

The above-described taper bolt connection may be used, for example, for fastening a rudder unit 17 to a carrying structure of a fuselage cell of an aircraft.

What is claimed is:

1. A taper bolt connection for use in an aircraft comprising a taper bolt comprising a wedge surface, a taper bush having a wedge surface, a fastening nut, and a washer, wherein the taper bush comprises a continuous longitudinal slot, wherein the taper bush is capable of being spread open uniformly in the radial direction by means of the fastening nut screwed onto said taper bolt, wherein a longitudinal extent of the taper bush wedge surface corresponds to a longitudinal extent of said taper bolt wedge surface, and wherein said taper bolt is capable of avoiding a tribochemical reaction between the contact surfaces of said taper bolt and said taper bush by means of includes a polytetraflouroethylene-containing coating comprising at least three strips arranged uniformly spaced apart from one another, around the circumference of said taper bolt, and each strip extending over the entire longitudinal extent of said taper bolt wedge surface.

2. The taper bolt connection according to claim 1, wherein the taper bolt wedge surface and the taper bush wedge surface each comprise an inclination ratio ranging from 0.01 to 0.1.

3. The taper bolt connection according to claim 1, wherein the Teflon containing coating comprises a thickness ranging from 0.01 mm to 0.5 mm.

4. The taper bolt connection according to claim 3, wherein the Teflon containing coating comprises a thickness of about 0.15 mm.

5. The taper bolt connection according to claim 1, wherein the taper bush and the taper bolt are formed from titanium.

6. The taper bolt connection according to claim 1, wherein the taper bush and the taper bolt are formed from high-grade steel.

7. The taper bolt connection according to claim 1, wherein the washer is arranged between the fastening nut and the taper bolt.

8. The taper bolt connection according to claim 1, wherein the fastening nut is a castle nut secured onto the taper bolt by means of a securing cotter pin.

9. Use of a taper bolt connection according to claim 8 for fastening a rudder unit to a fork connected to a carrying structure of a fuselage cell of an aircraft, comprising the steps of:

receiving the taper bush in a sleeve of the rudder unit, and two bore holes of the fork, introducing the taper bolt into the taper bush, bracing the taper bolt with the castle nut, locating the washer between the castle nut and the taper bush, bracing the taper bolt with the taper bush, tightening of the castle nut to draw the taper bolt into the taper bush, spreading the taper bush uniformly outwards in the radial direction; and bracing firmly the rudder unit with the fork.

\* \* \* \* \*